US006150597A

United States Patent [19]

Kakishita et al.

[11] Patent Number: 6,150,597

[45] Date of Patent: Nov. 21, 2000

[54] METHOD OF ARRANGING MUSIC WITH SELECTABLE TEMPLATES OF MUSIC NOTATION

[75] Inventors: Masahiro Kakishita; Hiromu Miyamoto, both of Hamamatsu, Japan

[73] Assignee: Yamaha Corporation, Japan

[21] Appl. No.: 09/393,879

[22] Filed: Sep. 10, 1999

[30] Foreign Application Priority Data

Sep. 22, 1998 [JP] Japan .................................. 10-267602

[51] Int. Cl.[7] ...................................................... G09B 15/02

[52] U.S. Cl. ..................................... 84/477 R; 84/DIG. 6

[58] Field of Search ................................. 84/477 R, 478, 84/DIG. 6

[56] References Cited

FOREIGN PATENT DOCUMENTS 4-261594 9/1992 Japan .
5-127673 5/1993 Japan .
9-006346 1/1997 Japan .
10-105173 4/1998 Japan .

*Primary Examiner*—Stanley J. Witkowski
*Attorney, Agent, or Firm*—Morrison & Foerster LLP

[57] ABSTRACT

An arrangement method is designed for arranging a target segment of music performance data by means of a template corresponding to an item of music notation to be applied to the target segment. The method is carried out by the steps of displaying music performance data on a monitor for designation of a target segment contained in the displayed music performance data and for selection of a specific item of the music notation to be applied to the target segment among various items of the music notation, retrieving a template corresponding to the specific item of the music notation among a group of various templates provisionally prepared in correspondence to the various items of the music notation, customizing the retrieved template to a pitch and a length of the target segment, and rewriting the target segment of the music performance data based on the customized template to thereby arrange the target segment according to the specific item of the music notation.

6 Claims, 13 Drawing Sheets

FIG.14
H
H
(2)
P
P
(3)
tr.
tr.
S
S
S
(5)
(6)
C
D
C
D
(7)
H.C
H.D
H.C
H.D
(8)
1H.C
1H.D
1H.C
1H.D
(9)
2C
2D
2C
2D
(10)
(11)
(12)
C
C
W.C
(13)
(15)
Q.C
U
Vib.

METHOD OF ARRANGING MUSIC WITH SELECTABLE TEMPLATES OF MUSIC NOTATION

BACKGROUND OF THE INVENTION

1. Field of the Invention

The present invention relates to a performance information arrangement method that executes performance information arrangement according to musical score symbols, and a recording medium recording a performance information arrangement program.

2. Description of Related Art

A personal computer based system for recording, editing and reproducing of performance information is implemented by connecting an external sound source to the personal computer, or by running sequencer software having a function of providing virtual sound sources. The performance information used here is usually sequence data in MIDI (Musical Instrument Digital Interface) format. Such performance information is recorded by means of "step by step input" based on one-by-one data input by use of a mouse or the like, or by means of "real-time recording" based on live performance by use of a MIDI device such as a MIDI keyboard or instrument connected to the personal computer. The performance information can be thus created through these recording processes. The performance information recorded is then reproduced for music performance, or further arranged or edited for better performance.

In editing, the performance information is graphically displayed in the form of a piano roll or a musical score to specify a target segment containing a desired note or notes out of all the displayed score of the performance information for altering a tone pitch or length or for deletion/insertion of note. Further, since there are various kinds of playing renditions in any musical instrument, the performance information may also be arranged in accordance with the playing renditions.

Referring now to a musical score of FIG. 14, various guitar playing renditions and corresponding score symbols of music notation will be described by way of example. A playing rendition shown in part (1) of FIG. 14 is a hammering or hammering-on. This playing rendition is performed to produce a tone in response to picking of a string and to produce a subsequent tone while tightly pressing an upper fret of the same string by a left finger without picking. The first half of part (1) of FIG. 14 shows a notation in a case where the hammering-on playing is conducted across two tones, giving a score symbol 'H' or 'h.' on a circular arc connecting the two notes. The second half of part (1) of FIG. 14 shows a notation in a case where the hammering-on playing is conducted with a grace note.

A playing rendition shown in part (2) of FIG. 14 is a pulling or pulling-off. The playing rendition is to conduct a technical performance that produces a tone in response to the picking of a string while pressing the same in position by a finger and then releases the string while getting the finger caught thereon to produce a tone on a lower fret of the same string without picking. The first half of part (2) of FIG. 14 (2) shows a notation in a case where the pulling-off playing is conducted across two tones, giving a score symbol 'P' or 'p.' on the circular arc connecting the two notes. The second half of part (2) of FIG. 14 shows a notation in a case where the pulling-off playing is conducted with a grace note.

A playing rendition shown in part (3) of FIG. 14 is a trill. The playing rendition is to conduct a specific performance that sustains a tone by quick repetition of hammering-on and pulling-off operations after picking. When a trill playing is conducted, a score symbol 'tr.' or 'tr.' followed by a wavy line is given as shown in the first half of part (3) of FIG. 14. The second half of part (3) of FIG. 14 shows a notation in a case where the trill playing is conducted with a grace note.

A playing rendition shown in part (4) of FIG. 14 is a slide. This is to vary the interval to a next tone by sliding a finger without picking. In this playing rendition, the hitting point of the tone is made clear. The slide notation is represented by giving a score symbol 'S' on the circular arc connecting plural notes. The second half of the first bar of the part (4) of FIG. 14 shows a notation in a case where the slide playing is conducted from a grace note. The second bar of the part (4) of FIG. 14 shows a notation in a case where such slide-up and slide-down operations as to make the starting point of the tone unclear is conducted.

A playing rendition shown in part (5) of FIG. 14 is a glissando that varies the interval to a next tone while sliding a finger without picking like the slide playing. The glissando is, however, different from the slide playing in that the hitting point of the tone is made unclear. When a glissando playing is conducted, a score symbol 'g.' is given with the wavy line or circular arc indicative of up or down of a tone following the note. The second bar of the part (5) of FIG. 14 shows a notation in a case where the glissando playing is conducted in a pick-scratch operation where a string is rubbed up or down with a pick.

A playing rendition shown in part (6) of FIG. 14 is a choking and choking-down that pushes up (pushes down) a pressed string by a finger in the vertical direction after picking so that the interval varies. The choking down is to return the string from the choked state to the original state. The notation is such that the choking and the choking-down are represented by giving score symbols 'C' and 'D' on the circular arc connecting plural notes, respectively. The second half of part (6) of FIG. 14 shows a choking and choking-down playing from a grace note.

Although the choking and choking-down operation varies an interval of whole tone, the following shows various kinds of interval variations other than the whole tone. The notation shown in part (7) of FIG. 14 denotes a half choking (score symbol: H.C) that gives an interval variation of semitone and a half choking-down (score symbol: H.D). The notation shown in part (8) of FIG. 14 denotes a one-and-half choking (score symbol: 1H.C) that gives an interval variation of one and half tones, and a one-and-half choking-down (score symbol: 1H.D). The notation shown in part (9) of FIG. 14 denotes a two choking (score symbol: 2C) that gives an interval variation of two whole tones, and a two choking-down (score symbol: 2D). The notation shown in part (10) of FIG. 14 denotes a unison choking (score symbol: C) that conducts the simultaneous picking of two strings while choking a lower tone so that the choked tone will be unisonous with the other tone. The notation shown in part (11) of FIG. 14 denotes a harmonized choking (score symbol: C) that obtains an interval other than the unison following the same choking operation as the unison. The notation shown in part (12) of FIG. 14 denotes a double choking (score symbol: W.C) that conducts the simultaneous picking and choking of two strings. The notation shown in part (13) of FIG. 14 denotes a quarter choking (score symbol: Q.C) that is to conduct a choking of one-quarter of the whole tone, but the choked interval is not necessarily an exact one-quarter of the whole tone. The notation shown in part (14) of FIG. 14 denotes a choking-up (score symbol: U), and the notation shown in part (15) of FIG. 14 denotes a vibrato (score symbol: Vib) that repeats choking-up and choking-down operations.

There are thus various playing renditions in the guitar. As apparent from the score in FIG. 14, beginners may misunderstand their guess as to what playing renditions are indicated by the score symbols written on the score, and this makes it difficult to input, one by one, performance information represented by the score symbols written on the score. Even if the score symbols can be given a correct correspondence with respective playing renditions, since lots of data need to be input for a faithful performance to the score symbols, it takes long time to create performance information through the step input. Besides, the creation procedures of the music performance data are complicated or troublesome.

Another approach to facilitate creation of performance information has been proposed, in which plural kinds of pitch variation templates are prepared beforehand so that one of pitch variation templates can be selected for imparting the performance information with a pitch variation corresponding to the selected template. In this approach, however, a problem still remains in that a correct template matching with a score symbol cannot be selected out of various pitch variation templates unless the user understands a correspondence between score symbols and the pitch variation templates prepared. In other words, beginners cannot easily create performance information even if such pitch variation templates are prepared, because beginners cannot allocate a correct template in matching with applied music notation.

SUMMARY OF THE INVENTION

It is therefore an object of the invention to provide a performance information arrangement method and a recording medium recording a performance information arrangement program that makes it easy to create performance information matching with the notation of score symbols even if the meanings of the score symbols written on a score are unknown.

In order to achieve the above noted object, the inventive method is designed for arranging a target segment of music performance data by means of a template corresponding to an item of music notation to be applied to the target segment. The inventive method is carried out by the steps of displaying music performance data on a monitor for designation of a target segment contained in the displayed music performance data and for selection of a specific item of the music notation to be applied to the target segment among various items of the music notation, retrieving a template corresponding to the specific item of the music notation among a group of various templates provisionally prepared in correspondence to the various items of the music notation, customizing the retrieved template to a pitch and a length of the target segment, and rewriting the target segment of the music performance data based on the customized template to thereby arrange the target segment according to the specific item of the music notation.

Preferably, the inventive method includes the step of displaying the customized template on the monitor such that the customized template can be further modified on the monitor so as to impart a desired variation to the arranged target segment.

Preferably, the inventive method includes the step of provisionally preparing a group of various templates in correspondence to the various items of the music notation which indicate various music renditions, such that each template contains music profile data representing the music rendition of the corresponding item of the music notation. In such a case, the step of rewriting rewrites the target segment of the music performance data by the music profile data of the customized template to thereby apply the music rendition to the target segment.

Preferably, the inventive method includes the step of provisionally preparing a first group of templates applicable to one note and a second group of templates applicable to more than one note, such that the first group can be selected when the target segment contains only one note and the second group can be selected when the target segment contains more than one note.

Further, an inventive apparatus is constructed for arranging a target segment of music performance data by means of a template corresponding to an item of music notation to be applied to the target segment. In the inventive apparatus, a monitor device displays music performance data. An input device is operated to designate a target segment contained in the displayed music performance data and to select an item of the music notation to be applied to the target segment among various items of the music notation. A processor is coupled to the monitor device and the input device. The processor Is adapted to perform a process comprising the steps of retrieving a template corresponding to the selected item of the music notation among a group of various templates provisionally prepared in correspondence to the various items of the music notation, customizing the retrieved template to a pitch and a length of the target segment, and rewriting the target segment of the music performance data based on the customized template to thereby arrange the target segment according to the selected item of the music notation.

Further, the invention covers a computer readable medium for use in a computer having a processor and a monitor. The inventive medium contains program instructions executable by the processor for causing the computer to perform a process of arranging a target segment of music performance data by means of a template corresponding to an item of music notation to be applied to the target segment. The process is performed by the steps of displaying music performance data on the monitor for designation of a target segment contained in the displayed music performance data and for selection of a specific item of the music notation to be applied to the target segment among various items of the music notation, retrieving a template corresponding to the specific item of the music notation among a group of various templates provisionally prepared in correspondence to the various items of the music notation, customizing the retrieved template to a pitch and a length of the target segment, and rewriting the target segment of the music performance data based on the customized template to thereby arrange the target segment according to the specific item of the music notation.

According to the invention, plural items of the music notation are displayed in the form of score symbol names and/or corresponding score symbols are displayed so that a desired score symbol name or score symbol can be selected out of the displayed score symbol names or score symbols, thereby selecting a proper performance information editing template corresponding to the selected score symbol. It is therefore possible to easily create the performance information corresponding to the rendition denoted by the score symbols regardless of whether the meanings of score symbols written on a score are known or unknown. This easily allows even beginners to create performance information of the score symbols written on the score. Further, various values of pitch variation parameters contained in a template selected out of the performance information templates prepared can be modified. It is therefore possible for any user to easily create diverse performance information with user's modification.

BRIEF DESCRIPTION OF THE DRAWINGS

These and other objects of the invention will be seen by reference to the description, taken in connection with the accompanying drawings, in which.

DETAILED DESCRIPTION OF PREFERRED EMBODIMENTS

Figure 1:
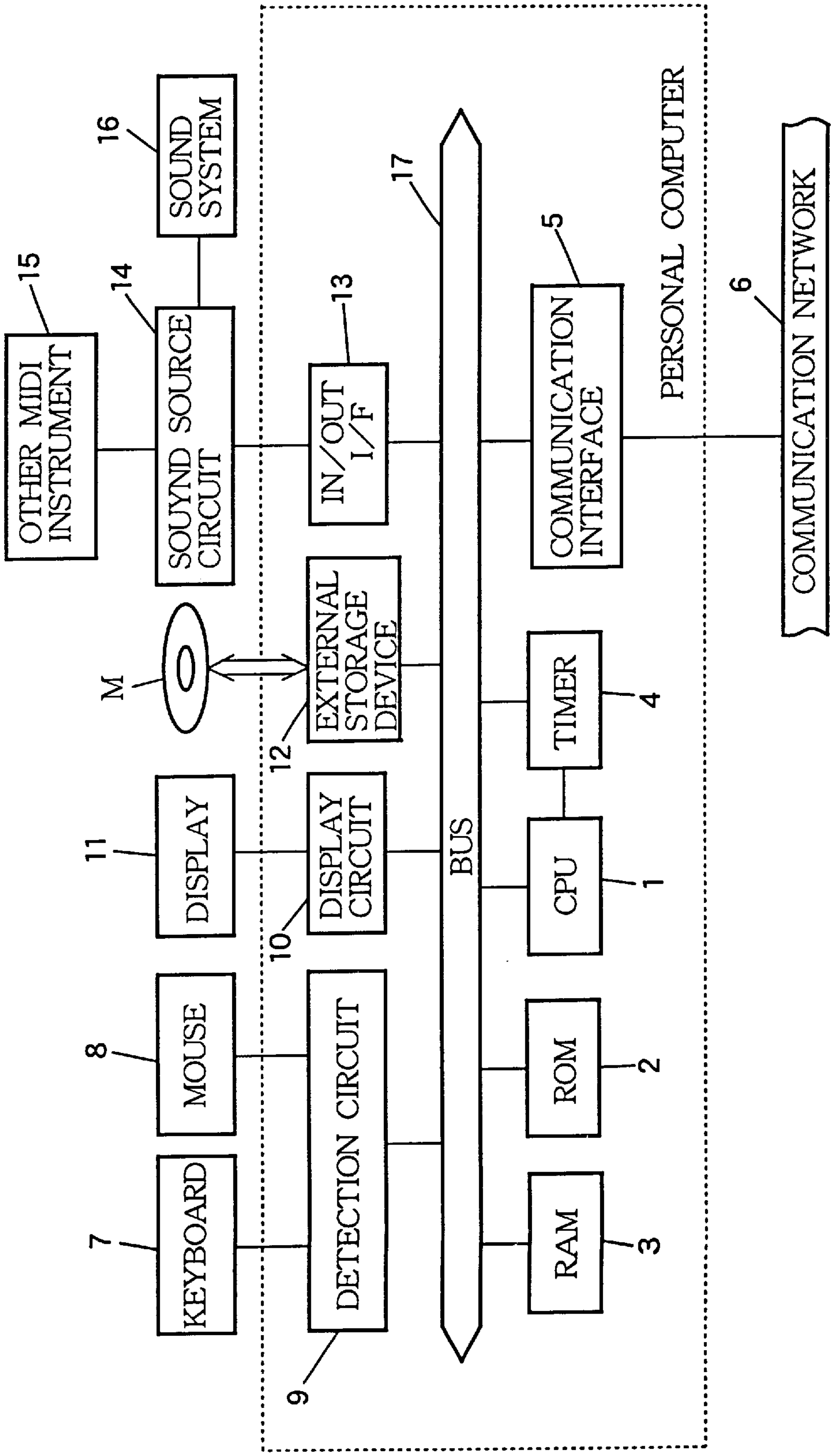
FIG. 1 is a block diagram illustrating a hardware configuration for executing a performance information arrangement method of the invention.

FIG. 1 shows an example of a hardware configuration for executing a performance information arrangement program practiced as one preferred embodiment of a performance information arrangement method of the invention. In FIG. 1, reference numeral 1 denotes a central processing unit (CPU) for controlling the entire operation in the hardware. Reference numeral 2 denotes a ROM (Read Only Memory) storing programs executed by the CPU 1 such as the performance information arrangement program according to the invention and further storing various kinds of data such as performance information editing template groups. Reference numeral 3 denotes a RAM (Random Access Memory), which is set with storage areas for storing customized and modified performance information editing templates and various edited data, a work area for the CPU 1, and so on. Reference numeral 4 denotes a timer, which counts elapsed time in operation and generates timer interrupt at specific intervals, for use in time management of automatic accompaniment, envelop control, effect control, and so on.

Reference numeral 5 denotes a communication interface for connecting the hardware to another computer through a communication network 6 such as a LAN (Local Area Network) including Ethernet or the Internet. The communication interface 5 allows application software such as the performance information arrangement program of the invention to be exchanged with another computer through the communication network 6. Reference numeral 7 denotes a personal-computer keyboard on which many keys are arranged. Key information created by key operation of the keyboard 7 is detected by a detection circuit 9 and sent to a bus 17. Reference numeral 8 denotes a mouse as a pointing device that operates a pointer displayed on the screen of a display 11. Input data created when the mouse 8 is moved or clicked is detected by the detection circuit 9 and sent to the bus 17.

Reference numeral 10 is a display circuit that converts digital display data to an analog signal to be sent to the display 11 so that a proper display can be achieved on the display 11. Reference numeral 11 denotes the display for displaying the contents of a performance information editing template and windows through which the contents of the performance information editing template can be presented ,and various values can be set on the display 11 through a graphical user interface. Reference numeral 12 denotes an external storage device capable of storing various application programs, such as the performance information arrangement program, and various data. The external storage device 12 can be made up of an HDD (Hard Disk Drive), an FDD (Floppy Disk Drive), a CD (Compact Disk)—ROM drive, an MO (Magneto Optical Disk) drive, a DVD (Digital Versatile Disk) drive, and so on. A computer readable medium M is inserted into these drives.

Reference numeral 13 denotes an IN/OUT interface for exchanging a MIDI signal with a sound source circuit 14.

Reference numeral 14 denotes the sound source circuit that generates a musical sound through plural tone generating channels based on musical sound control data stored in sound source registers. The sound source circuit 14 further imparts the musical sound with an acoustic effect such as reverb, chorus and variation, based on effect control data. Reference numeral 15 denotes another MIDI instrument such as a sequencer or electric musical instrument compatible with the MIDI standard. Reference numeral 16 denotes a sound system that amplifies the analog musical sound signal converted from a digital signal to produce music tones. Reference numeral 17 denotes the bus for use in exchanging information between the various blocks.

Figure 4:
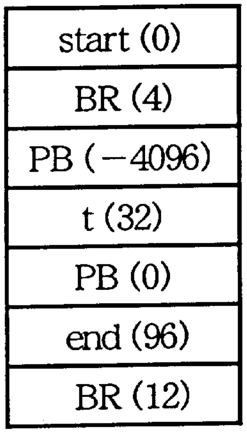
FIGS. 4(*a*), 4(*b*) and 4(*c*) are diagrams illustrating a structure of pitch arrangement data, a pitch variation profile displayed in a pitch variation display area, and an example of an editing screen on a monitor when a single tone is specified as an editing target in the performance information arrangement method practiced as the embodiment of the invention.
Figure 4:
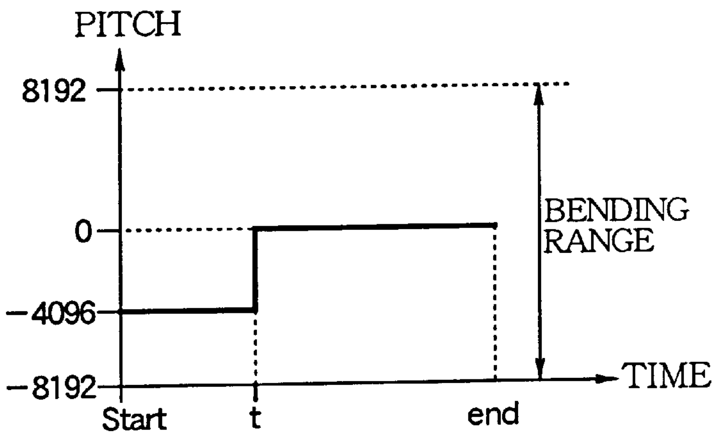
Figure 4:
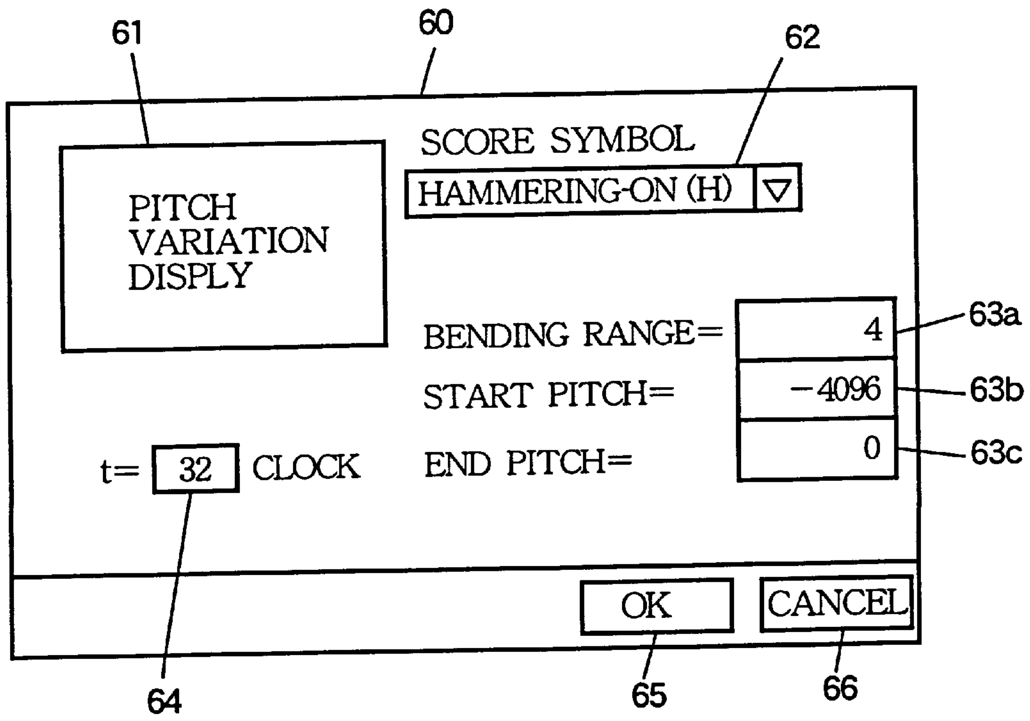

The above hardware configuration is the same as that of the personal computer or workstation. The performance information arrangement program according to the invention is activated when arranging or editing performance information created or recorded through the execution of sequencer software. In the hardware configuration of FIG. 1, when the pointer of the mouse 8 is put on 'Editing' of a menu on the screen of the display 11 and the mouse 8 is clicked, the performance information arrangement program is activated to be ready for the performance information editing. The screen displayed on the display 11 here is an editing screen such as shown in FIG. 4(*c*) to be described later.

As viewing the editing screen, the user selects a desired item of the music notation in the form of a score symbol or a score symbol name to be applied to a target segment in the displayed music performance data. Then, a particular template is automatically retrieved from the ROM 2. The template is further adapted to the target segment. In this case, the user may change a default value of the adapted template being displayed so as to vary the pitch of a note contained in the target segment to a desired one. After completion of the editing process, if the user places the pointer on a 'OK' button of the displayed menu and clicks the mouse 8, the 'Editing' ends and the performance data corresponding to the contents of the performance information editing template is stored in the RAM 3. After that, when the user puts the pointer on a 'Playback' button of the menu in the display of the sequencer software and clicks the mouse 8, an automatic performance is started based on the edited performance data. If the playback music does not go on as the user wants, the performance data can further be arranged or edited over and over again until the user obtains desired musical sounds.

Namely, the inventive method is designed for arranging a target segment of music performance data by means of a template corresponding to an item of music notation to be applied to the target segment. The inventive method is carried out by the steps of displaying music performance data on a monitor composed of the display 11 for designation of a target segment contained in the displayed music performance data by means of the mouse 8 and for selection of a specific item of the music notation to be applied to the target segment among various items of the music notation by means of the mouse 8, retrieving a template corresponding to the specific item of the music notation among a group of various templates provisionally prepared in correspondence to the various items of the music notation, customizing the retrieved template to a pitch and a length of the target segment, and rewriting the target segment of the music performance data based on the customized template to thereby arrange the target segment according to the specific item of the music notation. Further, the inventive method includes the step of displaying the customized template on the monitor such that the customized template can be further modified on the monitor so as to impart a desired variation to the arranged target segment.

Figure 2:
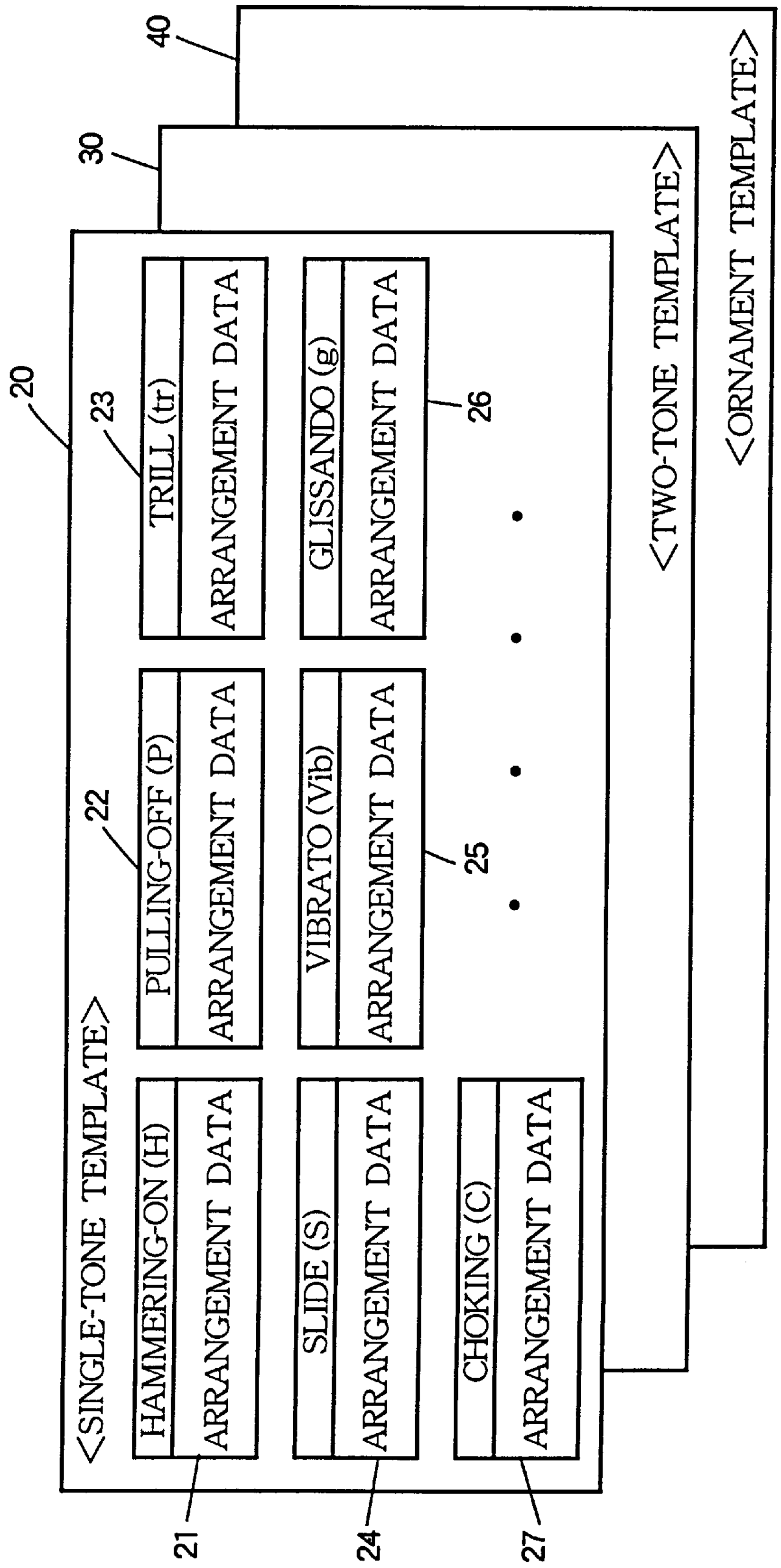
FIG. 2 is a schematic diagram illustrating a data format of performance information templates according to the invention.

Referring next to FIGS. 2 through 13, the performance information arrangement method of the invention will be described in detail. FIG. 2 is a schematic diagram illustrating the data structure of the performance information editing templates. For the performance information editing templates, three types of template groups are prepared, namely a single-tone template group 20, a two-tone template group 30, and an ornament template group 40. Generally, the inventive method includes the step of provisionally preparing a first group of templates applicable to one note and a second group of templates applicable to more than one note, such that the first group can be selected when the target segment contains only one note and the second group can be selected when the target segment contains more than one note.

Each template in the three types of template groups includes music profile data for arranging the original performance data with a pitch variation corresponding to a score symbol. A number of templates prepared for plural kinds of score symbols corresponding to respective playing renditions beforehand are provided in each of the single-tone template group 20, the two-tone template group 30, and the ornament template group 40. Namely, the inventive method includes the step of provisionally preparing a group of various templates in correspondence to the various items (various music symbols) of the music notation which indicate various music renditions, such that each template contains music profile data representing the music rendition of the corresponding item of the music notation. In such a case, the step of rewriting rewrites the target segment of the music performance data by the music profile data of the customized template to thereby apply the music rendition to the target segment.

In the single-tone template group 20, there are provided, for example, a hammering-on template 21 given a score symbol name 'Hammering-on' and a score symbol 'H', a pulling-off template 22 given a score symbol name 'Pulling-off' and a score symbol 'P', a trill template 23 given a score symbol name 'Trill' and a score symbol 'tr', a slide template 24 given a score symbol name 'Slide' and a score symbol 'S', a vibrato template 25 given a score symbol name 'Vibrato' and a score symbol 'Vib', a glissando template 26 given a score symbol name 'Glissando' and a score symbol 'G', a choking template 27 given a score symbol name 'Choking' and a score symbol 'C', and so on. In the two-tone template group 30 and the ornament template group 40, there are also provided the same templates corresponding to the same score symbol names.

Figure 3:
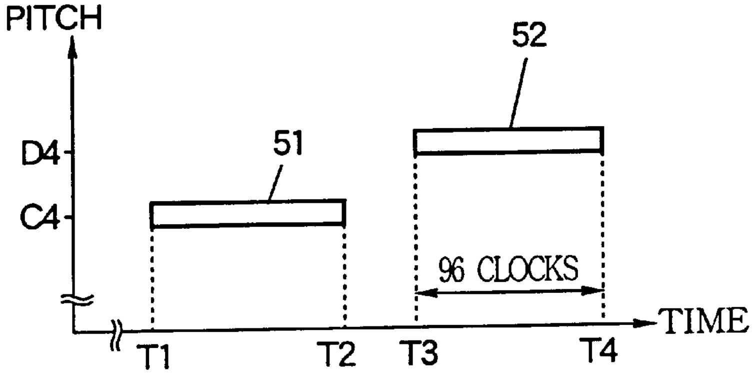
FIGS. 3(*a*) and 3(*b*) are diagrams illustrating music performance data and a piano roll of the performance data when a single note is specified as an editing target according to the invention.
Figure 3:
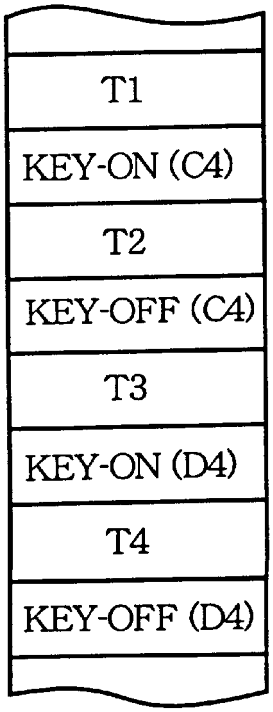

The process of editing or arranging the performance information is demonstrated through the following examples. The first example describes single-tone editing executed by specifying a single tone. FIG. 3(*b*) shows a target segment of the music performance data to be edited in this case. The performance data is loaded into the RAM 3, and consists of a sequence of event occurrence time and event data. In other words, data 'T1' and the following data 'Key-on(C4)' indicate that a tone of note C4 is generated at time T1. Data 'T2' and data 'Key-off(C4)' indicate that a tone of note C4 is silenced at time T2. The following performance data is processed in the same manner. It should be noted that data of T1, T2 . . . are represented as the number of clocks, and denote a time period from the start of music until the occurrence of each event. Further, the length of a one-eighth note is regarded as a tempo corresponding to 48 clocks of clock signals generated from the timer 4.

FIG. 3(*a*) is a graph illustrating the performance data of FIG. 3(*b*) in the form of a piano roll, taking a time represented by the number of clocks on the abscissa and taking a pitch represented by tone names on the ordinate, respectively. The piano roll may be a typical graphic representation of the performance data on the display 11. In this case, a tone 51 of note C4 is generated at time T1 and silenced at time T2. A next tone 52 of note D4 is generated at T3 and silenced at T4. The tone 52 of note D4 is a quarter note and the note length is of 96 clocks. When the user designates the tone 52 of note D4 and clicks the mouse 8 while placing the pointer on 'Editing' of the menu, the performance arrangement program of the invention is activated, the single-tone template group 20 is selected from the ROM 2, and the hammering-on template 21 set as a default in the single-tone template group 20 is read out. The content of the hammering-on template 21 is expanded or contracted in pitch variation position or variation progressing state according to the pitch and length of the note specified, and is displayed on the display 11 in a form adapted or customized to the note specified.

FIG. 4(*c*) shows an editing screen 60 displayed on the display 11 here. As shown in FIG. 4(*b*), a pitch variation is displayed in a pitch variation display area 61 in a visible form. Indicated in a drop-down list box 62 provided below a label 'Score Symbol' is 'Hammering-on (H)' as a default, which represents the score symbol name with the score symbol in parentheses. The user can put the pointer on a reverse-triangle shaped button located at the right end of the box 62 and click the mouse 8 to display a drop-down list of score symbol names with parenthesized score symbols. The list includes all the score symbol names corresponding to the templates stored in the single-tone template group 20 as shown in FIG. 2. When the user selects a desired score symbol name from the drop-down list displayed, a template corresponding to the selected score symbol name is automatically read out to replace the editing screen 60 with one corresponding to the read template. If the hammering-on is selected, the hammering-on template 21 is automatically read out from the single-tone template group 20 shown in FIG. 2, and the editing screen 60 shown in FIG. 4(*c*) is displayed. On this editing screen 60, a bending-range text box 63*a* indicates '4' as a default, a start-pitch text box 63*b* indicates '−4096' as a default, and an end-pitch text box 63*c* indicates '0' as a default. Further, a text box 64 of timing t that suddenly varies the pitch in the hammering-on operation indicates a clock number of '32' that has been changed according to the length of the note specified.

The graph of the pitch variation in the hammering-on operation of FIG. 4(*b*) is displayed in the pitch variation display area 61 of FIG. 4(*c*). This graph shows a pitch variation profile plotting the contents of the pitch arrangement data shown in FIG. 4(*a*). It should be noted that the pitch arrangement data shown in FIG. 4(*a*) indicates specific contents of the selected hammering-on template 21. The first data start(0) of the pitch variation arrangement data denotes a time indicative of start timing of the pitch variation, and means that the pitch variation is started from the key-on position (timing) of the specified note. The next data BR(4) means that the bending range is set to 4. In the MIDI, the set bending range is evenly divided by 16384 so that the pitch bending will be expressed by a value ranging from −8192 to 8192. In other words, if the bending range is set to 4, a pitch variation of two whole tones (upper and lower whole tones) is allowed in a range from −8192 to 8192 across the scale span of the pitch axis (see FIG. 4(*b*)). With subsequent data, the value 'PB(−4096)' means that the pitch bending value is −4096, where the pitch variation is started from a pitch bent down by a semitone. The next data 't(32)' indicates a timing at which pitch bending represented by the following data 'PB(0)' is read out and set. The data 't32' means that the pitch bending becomes 0 (or reset) to return to the original pitch at 32 clocks. The next data 'END(96)' means that end timing of the pitch variation (at which the tone is silenced) comes after 96 clocks from the start timing. The next data 'BR(12)' means that the bending range is reset to a default value ('12' in this example).

Such pitch arrangement data is visualized into the pitch variation profile shown in FIG. 4(*b*). The graph takes time represented by the number of clocks on the abscissa and pitch ranging from −8192 to +8192 on the ordinate. As shown, the pitch variation is started at time 0 from a pitch with pitch bending=−4096, such that the pitch reaches a pitch bending of 0 at 32 clocks and is sustained until the end time (end=96 clocks). In the read template, the note length is made correspondent to a pitch variation data length of 96 clocks. If the length of the specified note does not correspond to the length of 96 clocks, the data length of the template is automatically expanded or contracted to match with the length of the specified note for customization of the template to the designated segment of the music performance data.

If the values appearing in the text boxes 63*a* to 63*c* and 64 displayed on the editing screen 60 of FIG. 4(*c*) are acceptable by the user, the user puts the pointer on an OK button 65 and clicks the mouse 8. If the displayed value needs to be changed, the user can put the pointer on the text box concerned and click the mouse 8 to change the value. When canceling the editing process for a reason such as false specification of a note, the user puts the pointer on a cancel button 66 and clicks the mouse 8 so that the performance information arrangement program will terminate. It should be noted that, when the user puts the pointer on the OK button and clicks the mouse 8, the performance data corresponding to the specified note is edited based on the pitch arrangement data of the template shown in FIG. 4(*a*).

Figure 5:
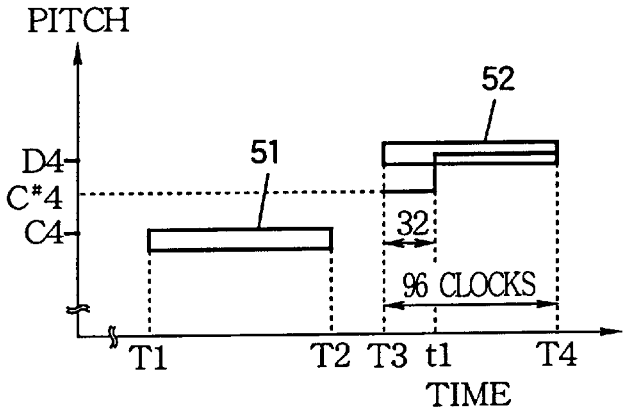
FIGS. 5(*a*) and 5(*b*) are diagrams illustrating edited performance data and a pitch variation in the edited performance data when a single tone is specified as an editing target in the performance information arrangement method practiced as the embodiment of the invention.
Figure 5:
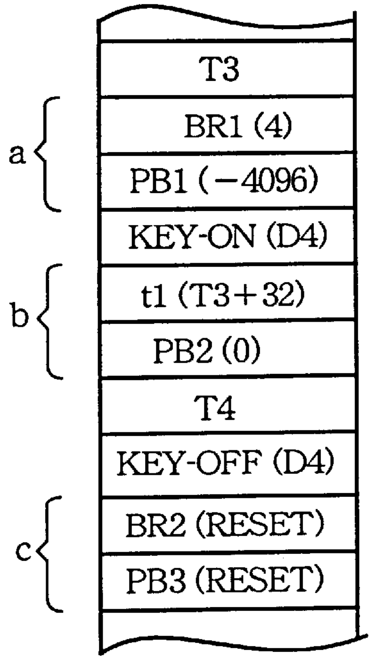

FIG. 5(*b*) shows the edited performance data. FIG. 5(*a*) shows the pitch variation in the edited performance data. A comparison between the edited performance data shown in FIG. 5(*b*) and the original performance data shown in FIG. 3(*b*) shows that values indicated by regions a, b and c are added to the edited performance data. Specifically, data 'BR1(4)' indicative of a bending range and data 'PB1(−4096)' indicative of the amount of pitch bending are added after the data 'T3'. Then, timing data 't1(T3+32)' that gives a pitch variation characteristic of the hammering-on playing and data 'PB2(0)' indicative of the amount of pitch bending are added after the data 'Key-on(D4)'. Further, data 'BR2(Reset)' that resets the bending range to a default value and data 'PB3(Reset)' that resets the pitch bending are added after the data 'Key-off(D4)'. Thus, both data of bending range and pitch bending are reset because both data are limited to have only a single value for each channel. If both the bending range data and the pitch bending data are added at the time of editing, both data added may affect other tones before and after the edited tone. Both data are thus reset so that other tones before and after the edited tone will not be affected by both data added at the time of editing.

In reproducing the edited performance data, as shown in FIG. 5(*a*), the tone 52 of note D4 specified is generated at time T3 as a tone of C#4 lower by a semitone than the note D4, and varied in pitch to the note D4 at a time of (T3+32) clocks. This pitch variation features the hammering-on playing, and then the tone is silenced at time T4 after 64 clocks have elapsed. Thus, the specified D4 note is generated in the hammering-on rendition.

As discussed above, even if the user does not know what playing rendition is meant by each score symbol written on a score nor does know how the pitch is varied, a proper template matching with the score symbol on the score can be automatically selected and customized on the editing screen 60 displayed on the display 11, thereby editing the performance data to exhibit a pitch variation matching with the score symbol.

Figure 6:
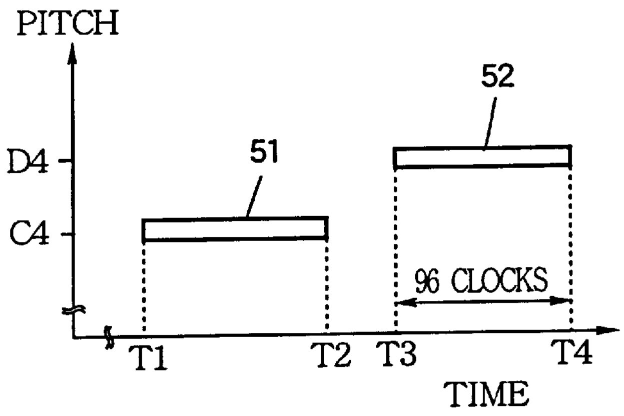
FIGS. 6(*a*) and 6(*b*) are diagrams illustrating performance data and a piano roll of the performance data when two tones are specified as an editing target according to the invention.
Figure 6:
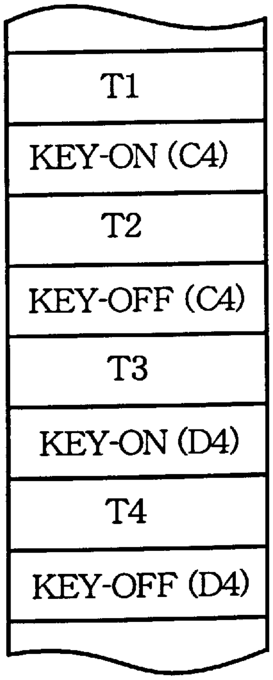

The next example describes two-tone arrangement executed by specifying two notes. FIG. 6(*b*) shows a target segment of the performance data in the form of MIDI sequence data in this case. The performance data is the same as that shown in FIG. 3(*b*). The length of one-eighth note is also regarded as a unit tempo corresponding to 48 clocks of clock signals generated from the timer 4. FIG. 6(*a*) is a graphic representation of the performance data shown in FIG. 6(*b*) on a piano roll in the same manner as in FIG. 3(*a*). When the user specifies the tone 51 of C4 and the tone 52 of note D4, and clicks the mouse 8 while putting the pointer on 'Editing' of the menu, the performance arrangement program of the invention is activated. Then, the two-tone template group 30 is selected from the ROM 2, and the hammering-on template set as default in the two-tone template group 30 is read out. The content of the read hammering-on template is customized into a pitch variation profile according to the pitches and lengths of the two notes specified, and displayed on the display 11.

Figure 7:
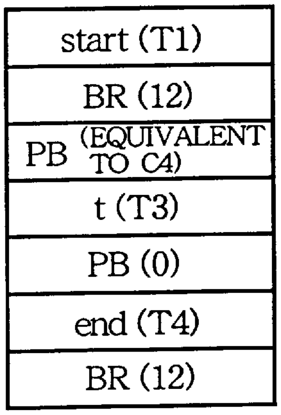
FIGS. 7(*a*), 7(*b*) and 7(*c*) are diagrams illustrating a format of pitch arrangement data, a pitch variation profile displayed in the pitch variation display area, and an example of an editing screen on a monitor when two tones are specified as an editing target in the performance information arrangement method practiced as the embodiment of the invention.
Figure 7:
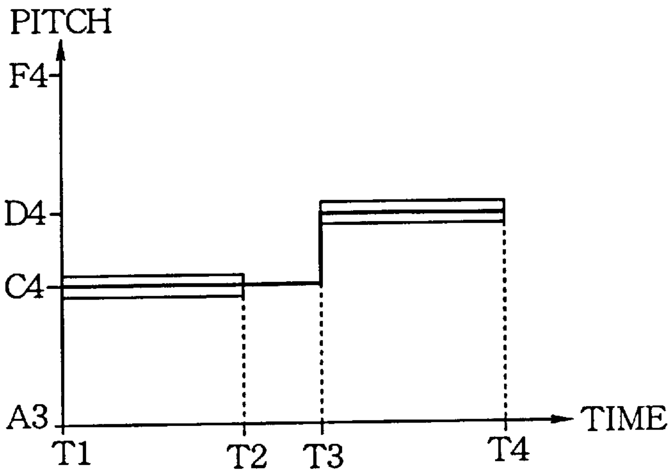
Figure 7:
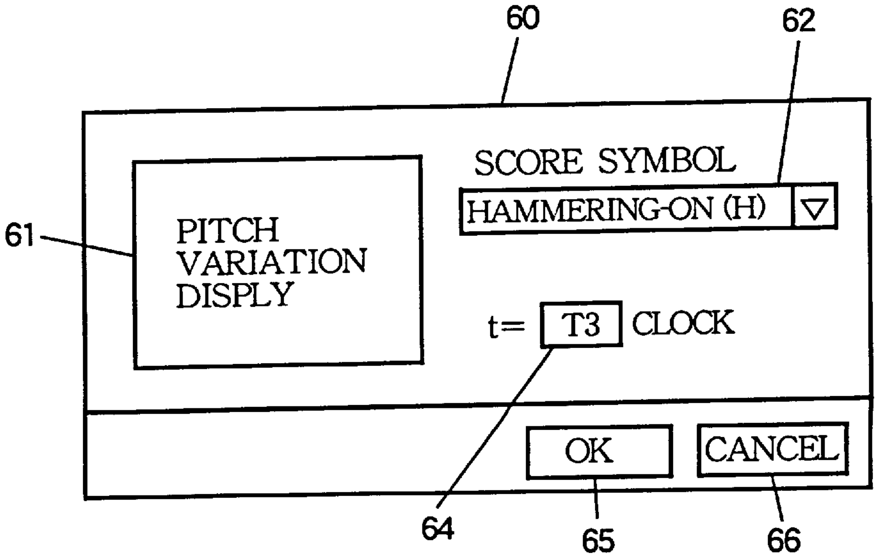

FIG. 7(*c*) shows an editing screen 60 displayed on the display 11 here. A pitch variation as indicated in FIG. 7(*b*) is displayed in the pitch variation display area 61 in a visible form. Indicated in a drop-down list box provided below the label 'Score Symbol' is 'Hammering-on (H)' as a default, which represents the score symbol name with the score symbol in parentheses. The user can put the pointer on the reverse-triangle shaped button located at the right end of the box 62 and click the mouse 8 to display a drop-down list of score symbol names with parenthesized score symbols. The list includes all the score symbol names corresponding to the templates stored in the two-tone template group 30 shown in FIG. 2. When the user selects a desired score symbol name from the drop-down list displayed, a template corresponding to the selected score symbol name is automatically read out to replace the editing screen 60 with one corresponding to the read template. If the hammering-on is selected, the hammering-on template is automatically read out from the two-tone template group 30 shown in FIG. 2, and the editing screen 60 shown in FIG. 7(*c*) is displayed. On this editing screen 60, a text box 64 of timing t indicates a time at which the pitch suddenly varies in the hammering-on operation. The text box 64 is filled with a clock number corresponding to T3 that has been changed according to the length of the note specified.

The graph of the pitch variation in the hammering-on operation of FIG. 7(*b*) is displayed in the pitch variation display area 61. This graph shows a pitch variation profile plotting the content of the pitch arrangement data shown in FIG. 7(*a*). The pitch arrangement data shown in FIG. 7(*a*) indicates specific contents of arrangement data in the selected hammering-on template. The first data START(T1) of the pitch variation arrangement data specifies top timing of the specified range as start timing of the pitch variation. In other words, it is meant that the pitch variation is started at time T1. The next data BR(12) means that the bending range is set to 12. Subsequently, the next data 'PB (equivalent to C4)' is determined from the pitch of the first specified note 51 as pitch bending data to the pitch of the second note 52. In this case, this data is determined as data indicative of a pitch difference of the tone 51 of note C4 with respect to the tone 52 of note D4. The next data 't(T3)' indicates timing at which pitch bending represented by the following data 'PB(0)' is set. The data 't(T3)' means that the timing at which the pitch bending becomes 0 to reach the pitch of the second note (D4) comes after T3 clocks from the start timing, i.e., the timing at which the second tone of the specified tones is generated. The next data 'END(T4)' is data for determining end timing of the pitch variation as the last timing in the specified range. In this case, the end timing comes after T4 clocks. The next data 'BR(12)' means that the bending range is reset to a default value ('12' in this example).

Such pitch arrangement data is graphically presented in the pitch variation profile shown in FIG. 7(*b*). The graph takes a time represented by the number of clocks on the abscissa and a pitch written by note names on the ordinate. As shown, the pitch variation is started at time T1 from a pitch of C4. The pitch is sustained until time T3, suddenly varies at time T3 to a pitch of D4, and then sustained until time T4.

If the value appearing in the text box 64 displayed on the editing screen 60 of FIG. 7(*c*) is acceptable by the user, then the user puts the pointer of the mouse 8 on the OK button 65 and clicks the button of the mouse 8. If the value needs to be changed, the user can put the pointer on the text box 64 and click the mouse 8 to change the timing value for sudden pitch variation. When canceling the two-tone editing process for a reason such as specification of a false note, the user puts the pointer on the cancel button 66 and clicks the mouse 8 so that the performance information arrangement program will end. It should be noted that, when the user puts the pointer on the OK button and clicks the mouse 8, performance data corresponding to specified notes are edited based on the pitch arrangement data shown in FIG. 7(*a*).

Figure 8:
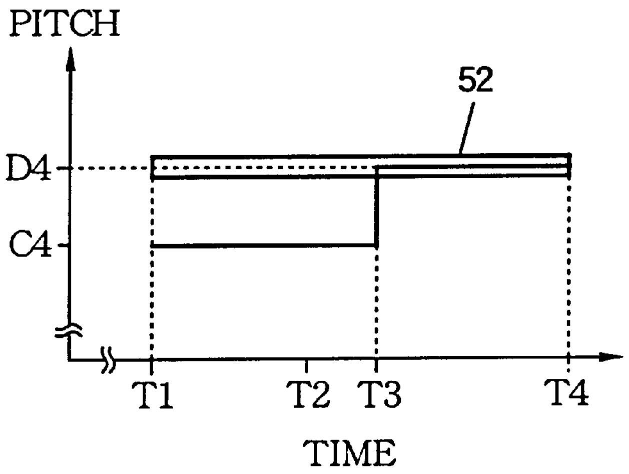
FIGS. 8(*a*) and 8(*b*) are diagrams illustrating edited performance data and a pitch variation in the edited performance data when two tones are specified as an editing target in the performance information arrangement method practiced as the embodiment of the invention.
Figure 8:
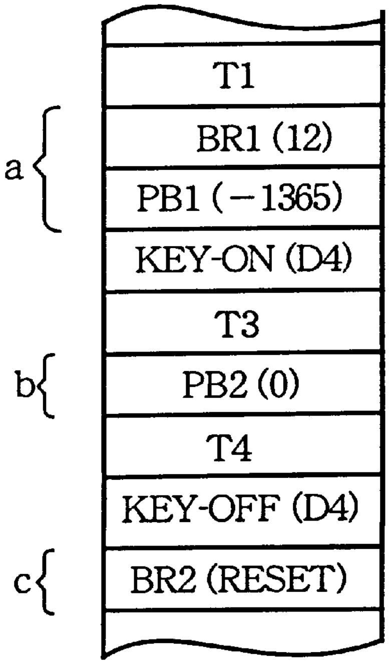

FIG. 8(*b*) shows the thus edited performance data. FIG. 8(*a*) shows the pitch variation in the edited performance data. As shown in FIG. 8(*b*), data 'Key-on(C4)', 'T2' and 'Key-off(C4)' in the original performance data of FIG. 6(*b*) before edited are eliminated from the edited performance data, while data indicated by marks a, b and c are added to the edited performance data. Specifically, data 'BR1(12)' indicative of a bending range and data 'PB1(−1365)' indicative of the amount of pitch bending are added after the data 'T1'. Then, the recording position of the data 'Key-on(D4)' is shifted and data 'PB2(0)' indicative of the amount of pitch bending is added after the data 'T3'. Further, data 'BR2 (Reset)' that resets the bending range to a default value is added after the data 'Key-off(D4)'. It should be noted that, since the bending range is 12 and the difference between D4 and C4 is a whole tone, '−1365' in the data 'PB1(−1365)' is determined as: $PB=(16384/12)\times(-1)=-1365$.

In the edited performance data, only the part of the tone 52 of note D4 corresponding to the second note in the specified target segment is thus processed as performance data to be generated. That is, the performance data is created by applying the hammering-on to the tone 52 of note D4. In reproducing the edited performance data, as shown in FIG. 8(*a*), the tone 52 of note D4 corresponding to the second note in the specified range is generated from time T1 as the tone of C4 lower by a whole tone than the note D4, then suddenly varied in pitch to the note D4 at time T3, and silenced at time T4. Thus, when two tones are specified for hammering-on playing, this hammering-on rendition is introduced such that the second tone specified is varied in pitch by a difference between the first and second tones.

As discussed above, even if the user does not know what playing rendition is meant by each score symbol written on a score nor does know how the pitch is varied, a score symbol can be selected on the editing screen 60 displayed on the display 11, thereby editing the performance data to exhibit a pitch variation matching with the selected score symbol.

Figure 9:
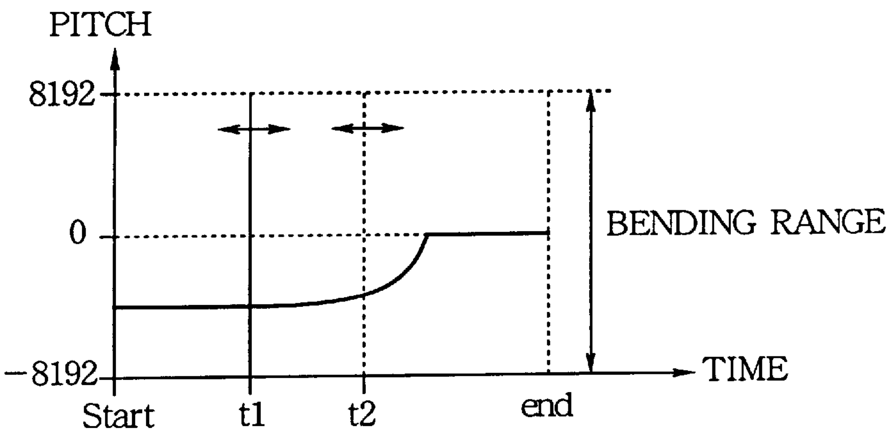
FIGS. 9(*a*) and 9(*b*) are diagrams illustrating a pitch variation profile indicative of a pitch variation displayed in the pitch variation display area and a display screen when performance data is edited in matching with choking operation in the performance information arrangement method practiced as the embodiment of the invention.
Figure 9:
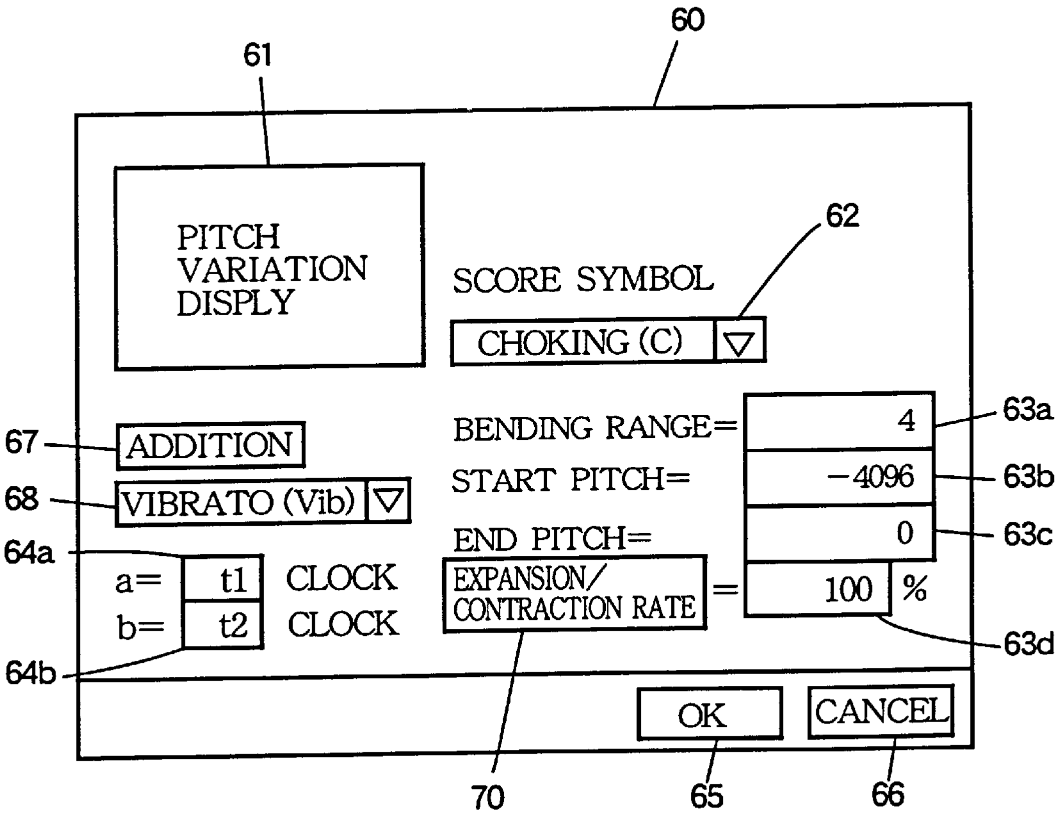

A description will be made next to another mode of editing in the performance information arrangement method of the invention. FIG. 9(*b*) shows an editing screen 60 in case of an arrangement in a choking operation. FIG. 9(*a*) shows a pitch variation profile indicative of a pitch variation displayed in the pitch variation display area 61 of the editing screen 60. This editing screen 60 appears when 'Choking (C)' displayed by opening the drop-down list box 62 provided below the label "Score Symbol' is selected by putting the pointer thereon and by clicking the mouse 8 so that the choking play will be applied to the performance data. The editing screen 60 includes the bending-range text box 63*a,* the start-pitch text box 63*b,* the end-pitch text box 63*c,* and an expansion/contraction rate text box 63*d.* There are also provided here text boxes 64*a* and 64*b* of time a and time b for determining timing of a range to be expanded or contracted. The editing screen 60 further includes an addition button 67 for adding any template corresponding to another score symbol into the range defined by time a and time b, a drop-down list box 68 for additional score symbol names, and an expansion/contraction rate button 70 for determining the expansion/contraction rate.

FIG. 9(*a*) shows a pitch variation profile indicative of the pitch variation in case of choking operation, in which a pitch of a tone generated at time START is gradually raised and sustained until time END. In the profile, time a and time b are expressed by t1 clock number and t2 clock number, respectively. The user can put the pointer on auxiliary lines indicated by broken lines and drag them laterally so as to set time a and time b to desired values. As a result, the values in the text boxes 64*a* and 64*b* of time a and time b, and the value of the expansion/contraction rate are changed according to the setting of time a and time b. The user can also change the values of the text boxes 63*d,* 64*a* and 64*b* directly by means of the keyboard, so that time a and time b will be set to desired values. Then, the user puts the pointer on the expansion/contraction rate button 70 and clicks the mouse 8 so that the expansion/contraction rate becomes the set value.

Figure 10:
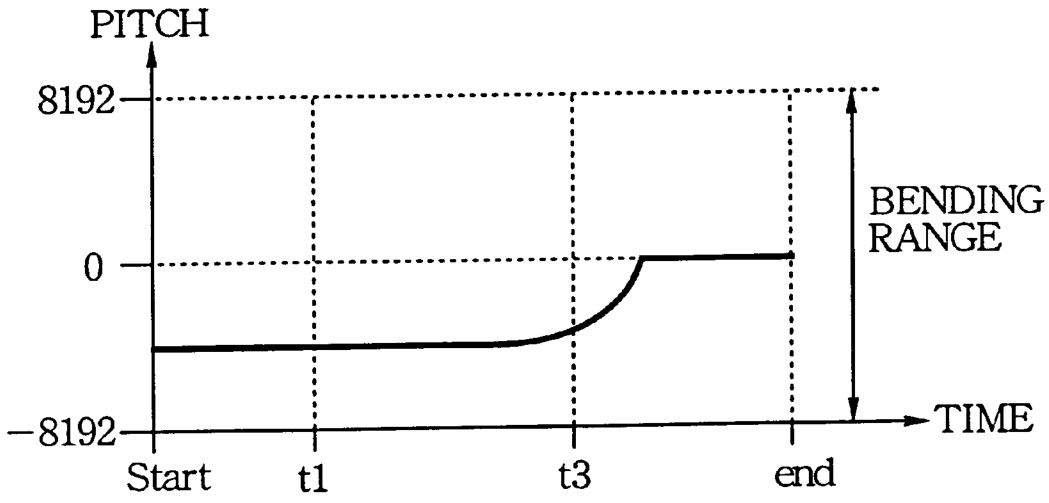
FIGS. 10(*a*) and 10(*b*) are diagrams illustrating another example of a pitch variation displayed in the pitch variation display area when performance data is edited to present choking operation in the performance information arrangement method practiced as the embodiment of the invention.
Figure 10:
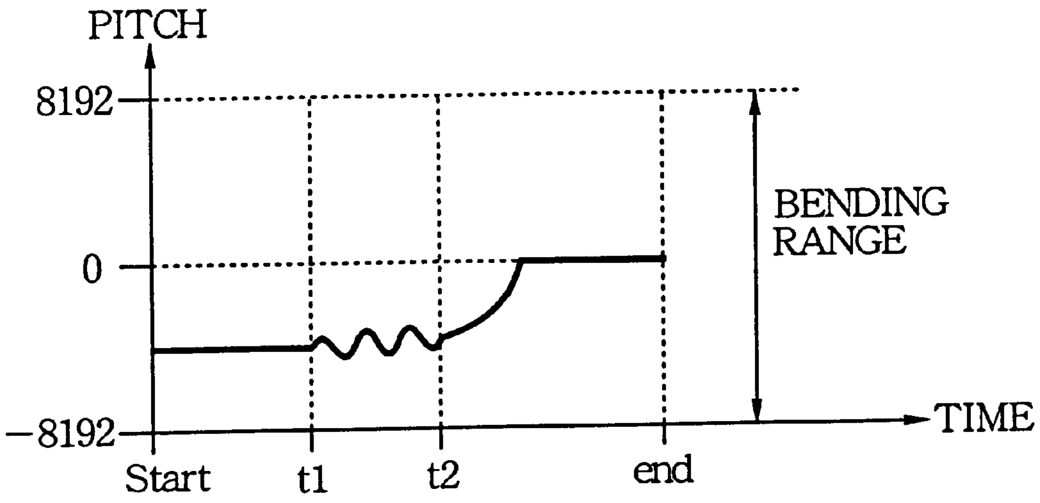

As an example, FIG. 10(*a*) shows a pitch variation profile indicative of a pitch variation when an expansion/contraction rate of 200% is determined by setting the value in the expansion/contraction rate text box 63*d* to '200'% and by clicking the mouse 8 while putting the pointer on the expansion/contraction rate button 70. As shown in the profile, the interval between time a and time b is doubled to set time b to clock number t3. It should be noted that, after completion of the expansion/contraction processing, an expansion/contraction rate of '100'% and time of 't3' clock number are displayed in the expansion/contraction rate text box 63*d* and the text box 64*d* of time b on the editing screen 60, respectively.

Further, the user opens a drop-down list in the drop-down list box 68 for additional score symbol names and selects a symbol name 'Vibrato (Vib)'. Then, when the user puts the pointer on the addition button 67 and clicks the mouse 8, a pitch variation corresponding to the vibrato playing is added into the range from time a to time b. FIG. 10(*b*) shows a pitch variation profile indicative of a pitch variation in this case. As shown in the profile, the vibrato playing is conducted between time a and time b.

Figure 11:
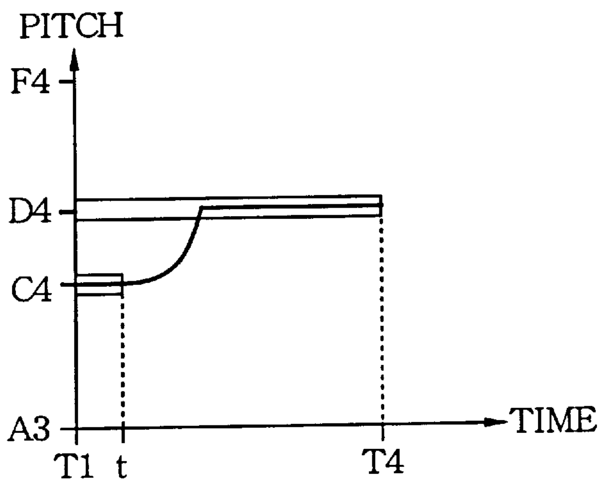
FIGS. 11(*a*) and 11(*b*) are diagrams illustrating a pitch variation profile indicative of a pitch variation displayed in the pitch variation display area and a display screen displayed on a monitor when addition of an ornament is instructed in the performance information arrangement method practiced as the embodiment of the invention.
Figure 11:
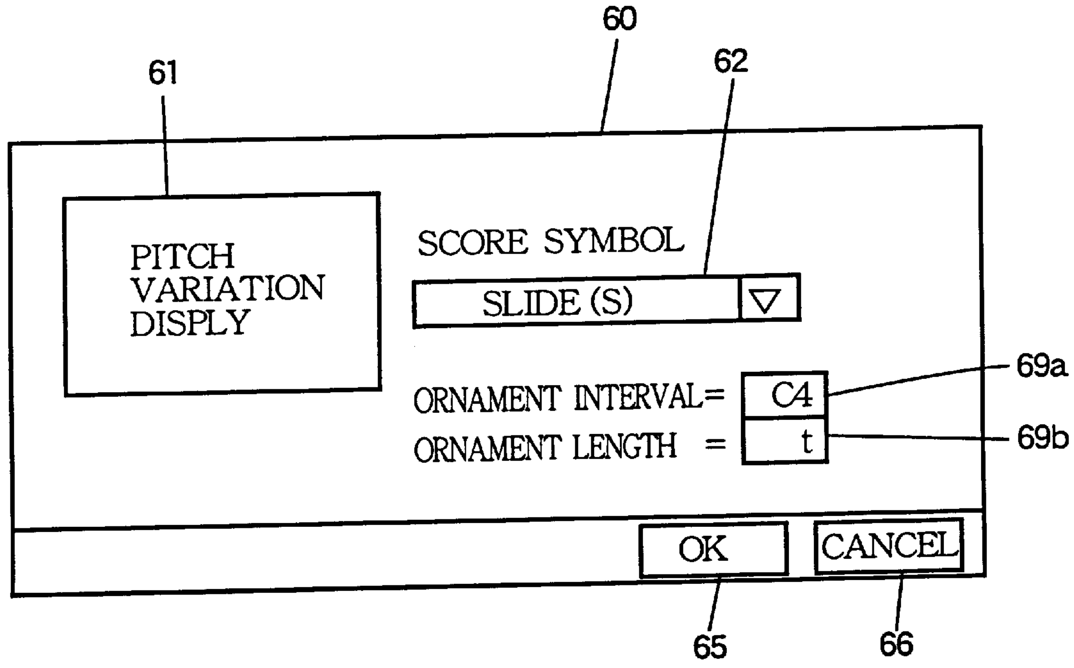

A description will be made next to an example of editing a note with an ornament in the performance information arrangement method of the invention. FIG. 11(*a*) shows a pitch variation profile indicative of a pitch variation in the case where a note with an ornament is designated. FIG. 11(*b*) shows an editing screen 60 displayed on the display 11 here. The graph of FIG. 11(*a*) is a pitch variation profile illustrating the pitch variation displayed in the pitch variation display area 61. When the user specifies note D(4) as being generated at timing between T1 and T4 and clicks the mouse 8 while putting the pointer on 'Editing' of the menu, the performance arrangement program of the invention is activated. Then, the ornament template group 40 is selected from the ROM 2, and one of the templates, for example, the slide template, in the ornament template group 40 is read out. The contents of the read slide template are customized based on the pitch and length of the specified note so that the slide playing with the ornament can be introduced into the music performance, and the customized template is displayed on the display 11.

FIG. 11(*b*) shows an editing screen 60 displayed on the display 11 here. As shown in FIG. 11(*b*), the pitch variation as indicated in FIG. 11(*a*) is displayed in the pitch variation display area 61 in a visible form. Indicated in a drop-down list box 62 provided below the label 'Score Symbol' is 'Slide (S)' as a default, which represents the score symbol name with the score symbol in parentheses. The user can put the pointer on the reverse-triangle shaped button located at the right end of the box 62 and click the mouse 8 to display a drop-down list of score symbol names with parenthesized score symbols. The list includes all the score symbol names corresponding to the templates belonging to the ornament template group 40 shown in FIG. 2. When the user selects a desired score symbol name from the drop-down list displayed, a template corresponding to the selected score symbol name is automatically read out to replace the editing screen 60 with one corresponding to the read template. If the slide symbol is selected, the slide template is automatically read out from the ornament template group 40 shown in FIG. 2, and the editing screen 60 shown in FIG. 11(*b*) is displayed. On this editing screen 60, an ornament interval text box 69*a* and an ornament length text box 69*b* are provided. Now, an ornament interval of 'C4' and an ornament length of 't' are displayed in the text boxes 69*a* and 69*b,* respectively, but the ornament interval and length can be modified to desired values.

The graph of the pitch variation from the ornament in the slide operation of FIG. 11(*a*) is displayed in the pitch variation display area 61. The graph takes a time represented by the number of clocks on the abscissa and a pitch written by note names on the ordinate. As shown, the pitch variation is started at time T1 from a pitch of C4 as a grace note of the ornament. The pitch is sustained until time t, then gradually varied in pitch from time t to a pitch of D4, and finally sustained until time T4.

If the values appearing in the text boxes 69*a* and 69*b* displayed on the editing screen 60 is acceptable by the user, then the user puts the pointer on the OK button 65 and clicks the mouse 8. If a value needs to be changed, the user can put the pointer on a desired one of the text boxes 69*a* or 69*b* and click the mouse 8 to change the ornament interval or the ornament length. When canceling the ornament editing process for a reason such as false specification of a note, the user puts the pointer on the cancel button 66 and clicks the mouse 8 so that the performance information arrangement program will end. It should be noted that, when the user puts the pointer on the OK button and clicks the mouse 8, the performance data can be edited based on the contents of the template displayed on the editing screen 60.

For the pitch variation profile displayed in the pitch variation display area 61 on each of the above editing screen 60, auxiliary lines may be displayed along the time axis and dragged laterally so as to set timing of the pitch variation or the time interval in the pitch variation profile. Such an auxiliary line may also be displayed along the pitch axis and so dragged vertically as to set the amount of pitch variation in the pitch variation profile. Further, edited templates may be added as new templates to corresponding template groups.

Figure 12:
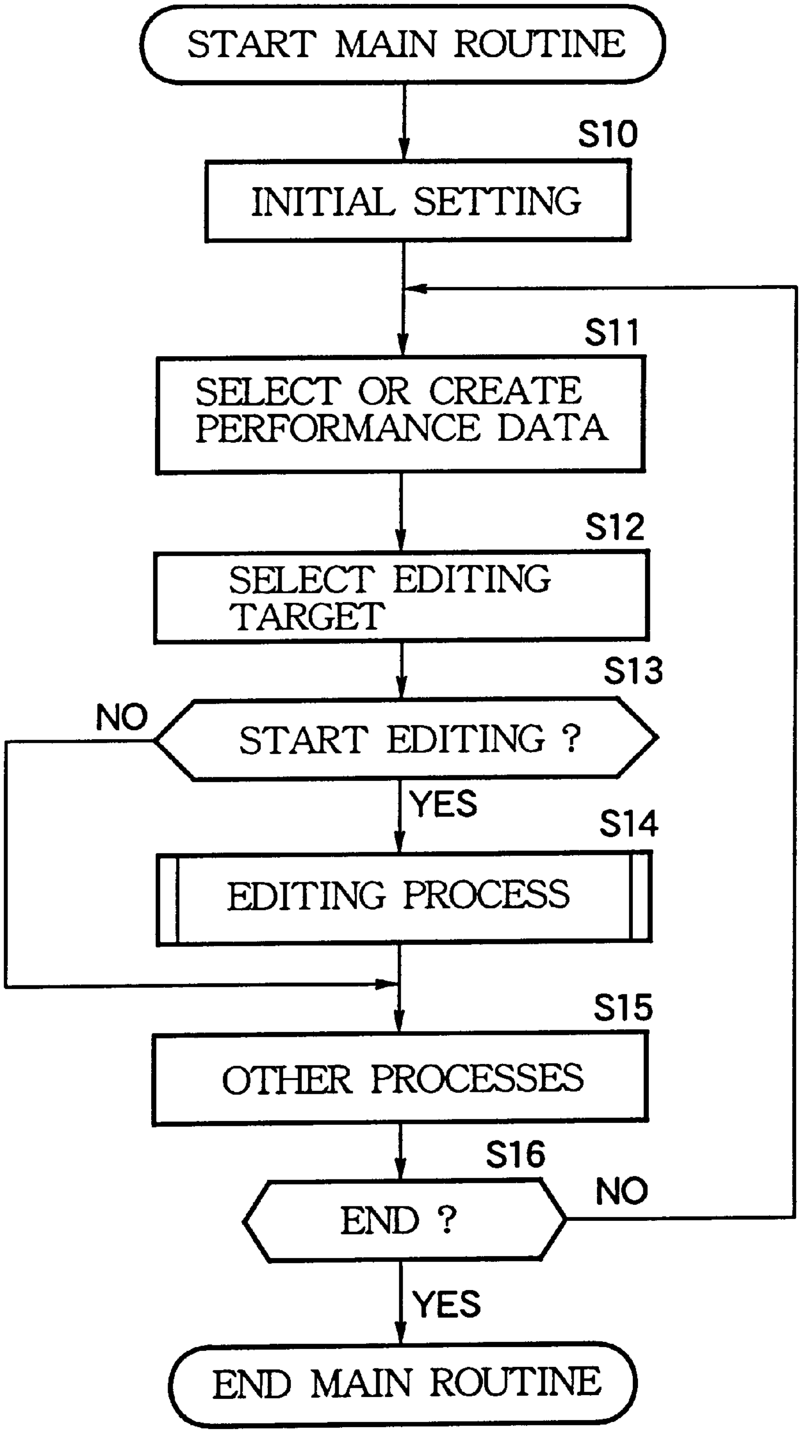
FIG. 12 is a flowchart of a main routine of sequencer software including the performance information arrangement program practiced as the embodiment of the performance information arrangement method of the invention.

A flowchart of FIG. 12 shows the main routine of sequencer software executed in the hardware configuration shown in FIG. 1, the sequencer software including the performance information arrangement program practiced as one preferred embodiment of the performance information arrangement method of the invention. When the sequencer software is activated, the main processing is started and initial setting process is executed in step S10. The initial setting process includes the setting of an initial display screen displayed on the display 11 and other initial settings such as initialization of various kinds of flags and recording areas allocated on the RAM 3. Then, in step S11, performance data of a desired music piece stored in the external storage 12 or the like is selected and read out, or new performance data is created. In step S12, a target segment to be edited is selected out of all the performance data displayed on the display 11. The user selects the target data by putting the pointer on a note to be edited and by clicking the mouse 8.

In the next step S13, it is determined whether or not the start of editing process for the score symbol is instructed. If the pointer is put on 'Editing' of the menu and the mouse 8 is clicked here, it is judged that the start of editing has been instructed and the editing process is executed in step S14. After completion of the editing process in step S14, or when the start of editing has not been instructed, the operating procedure branches to step S15 in which other processing is executed. The other processing includes reproduction (automatic playing) of performance data recorded or edited in the editing process, addition of a performance editing template, and so on. Then, in step S16, it is determined whether or not the end of the software is instructed. If the end instruction is not issued, the operating procedure returns to step S11 and a series of the operations from steps S11 through S15 are executed again. If the end instruction is issued, the main routine of the sequencer software ends.

Figure 13:
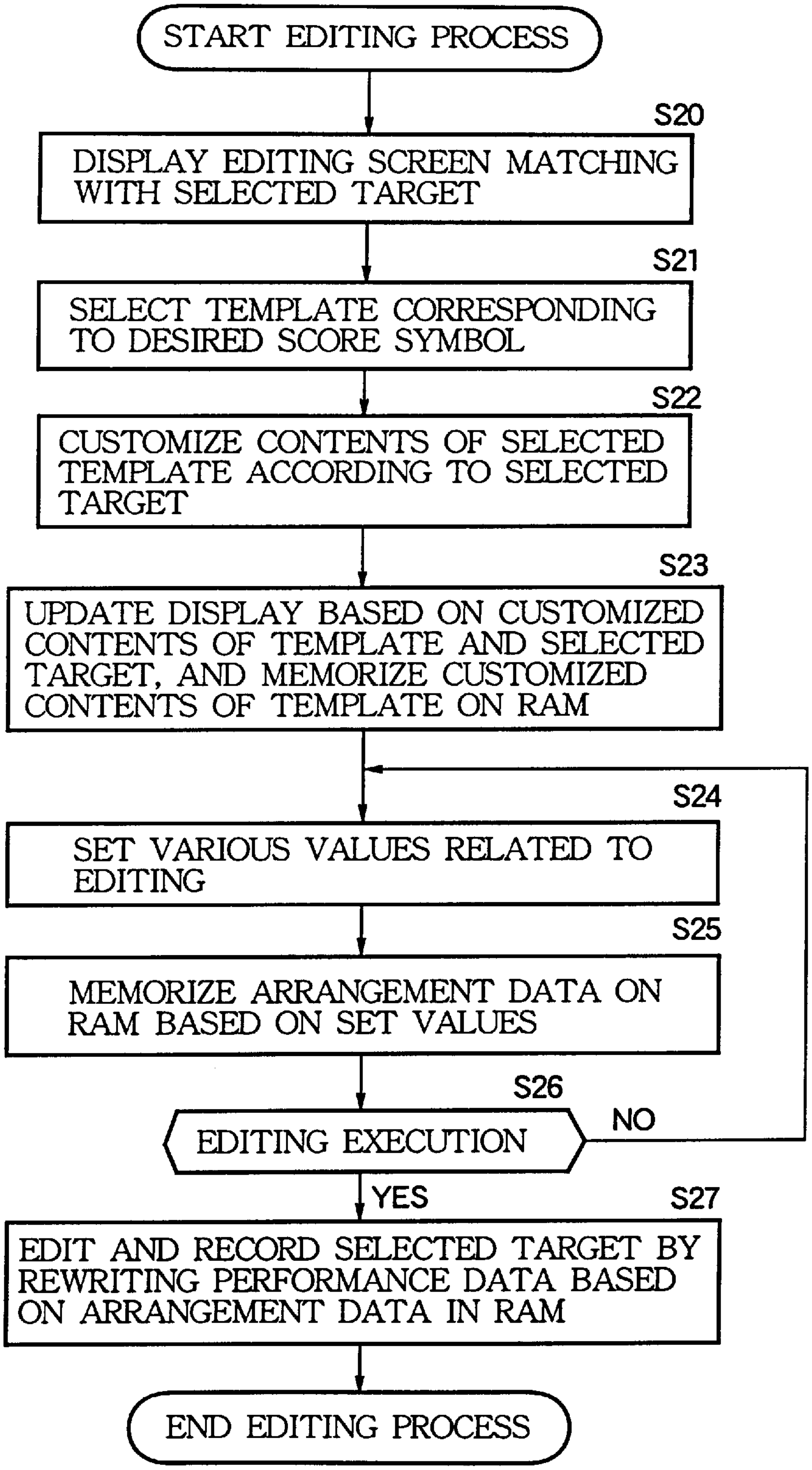
FIG. 13 is a flowchart of editing process implemented by the performance information editing process program according to the invention, the editing process being executed in step S14 of the main routine.
Figure 14:
FIG. 14 is a musical score for explaining various items of guitar playing renditions and score symbols corresponding to the playing renditions.

FIG. 13 shows a flowchart of the editing process executed in step S14 of the main routine, which is implemented by the performance information arrangement program according to the invention. In the flowchart of the editing process shown in FIG. 13, when the start of editing is instructed, the performance information arrangement program according to the invention is activated, and an editing screen matching with a selected target is displayed in step S20. In other words, if a single tone is specified as an editing target, the editing screen 60 for the single-tone template group 20 is displayed. If two tones are specified as editing targets, the editing screen for the two-tone template group 30 is displayed. If an ornament is to be added to the editing target or targets, the editing screen 60 for the ornament template group 40 is displayed. It should be noted that a menu is provided for instructing addition of an ornament to the editing target or targets. Then, in step S21, a template corresponding to a desired score symbol is selected. The template is selected by opening the drop-down list box for score symbols provided on the editing screen 60 and by selecting a desired score symbol name or parenthesized score symbol. Thus, a desired template can be selected as long as the score symbol name or the score symbol is known.

In step S22, the contents of the selected template are customized according to the pitch or length of the note specified as the selected target of the performance data. If a single tone is specified here, the variation position and variation progressing state are also expanded or contracted. If two tones are specified, a pitch variation profile is created based on the values of pitch variation information recorded in the selected template and the values of the selected targets. Then, in step S23, an editing screen 60 updated according to the contents of the template after customized is displayed on the display 11, and the contents of the template after customized is reserved on a predetermined area of the RAM 3. Further, in step S24, the values in the text boxes displayed on the editing screen 60 are set. The pitch arrangement data obtained based on the setting of the values is recorded in step S25 on a predetermined area of the RAM 3. In the setting processing of step S24, the user can modify the amount of pitch variation, the position to be changed, and the like to values the user wants, so that diverse pitch variations corresponding to various score symbols can be edited.

In the following step S26, it is determined whether or not editing execution is instructed. If the pointer is put on the OK button 65 of the editing screen 60 and the mouse 8 is clicked here, it is judged that the editing execution has been instructed and the operating procedure goes to step S27. In step S27, the performance data of the selected target is rewritten according to the pitch arrangement data recorded on the predetermined area of the RAM 3 to replace the original performance data with the rewritten performance data. As long as the OK button 65 is not being clicked, the processing of steps S24 and S25 can be repeatedly executed. Finally, the editing process ends and returns to the main routine. The editing process also ends when the user puts the pointer on the cancel button 66 and clicks the mouse 8.

Although the invention can be implemented by the sequencer software including a performance information arrangement program, it may be implemented in other forms. For example, the invention can be applied to a sequencer (player: automatic performance device) constituted of a personal computer and sequencer software. In this case, the sequencer software may be stored in a storage such as a magnetic disk, an optical disk, or a semiconductor memory, and supplied to a personal computer or through a network.

Automatic performance data may be in a compound form in which data of plural channels exist together, or in such a form that each channel of data is divided for each track.

Further, although in the above description the performance data is of 'Event+Absolute Time' system that represents time of occurrence of a performance event as an absolute time in music or a bar, the invention may adopt any other systems such as a 'Event+Relative Time' system that represents time of occurrence of a performance event as a time interval from the previous event, a 'Pitch (Rest)+Note Length' system that represents performance data by the pitch and length of the note or by the rest and the rest length, and a 'Solid' system that secures a memory area for each minimum resolution of the performance and stores a performance event into the memory area corresponding to the time of occurrence of the performance event.

The contents of any template are also not limited by the above description. The template just needs to be designed to instruct pitch conversion with respect to a note specified by the user. For example, the template may store functional equations so that pitch variations of the specified notes can be calculated one by one from the functional equations. Further, the editing target parameter in the template is not limited to the pitch, and other parameters such as velocity value may be adopted, for example.

Furthermore, the template selection method for use in the above editing process may be such that icons corresponding to respective score symbols are displayed and the mouse is clicked while putting the pointer on an icon so as to specify a corresponding template to be used.

Furthermore, although the above description is made to a case where performance data of single tone or two tones is edited, the invention is not limited thereto. For example, a pitch variation of performance data of three or more tones may be edited using a template. In such a case, template groups for three tones, four tones, etc. may be provided.

The editing processing described above is executed for a tone generating channel corresponding to a track of performance data, but it may be executed for plural tone generating channels corresponding to plural tracks of performance data in one operation. For example, performance data corresponding to six strings of a guitar may be created on six tracks so that each track can be edited individually. In this case, respective templates may be specified separately, or a set of arrangement data for plural tracks is prerecorded in correspondence to each score symbol in the ROM 2 so that plural tracks can be automatically edited by selecting a template for a desired score symbol and by specifying the number of tracks to be edited by the template concerned.

Furthermore, although in the above description, the bending range and the pitch bending are reset to predetermined default values after completion of the editing process, the bending range data and the pitch bending data for the performance data previous to the note to be edited may be retrieved and stored at the beginning of execution of the editing process so that the bending range data and the pitch bending data can be reset to those stored after completion of the last editing process, thereby returning the bending range and the pitch bending to those set before the present editing process.

The external storage 12 such as HDD is provided for storing sequencer software including the performance information arrangement program and other various data. Even if the sequencer software including the performance information arrangement program is not stored in the ROM 2, since the sequencer software including the performance information arrangement program can be stored on a hard disk in the HDD and loaded into the RAM 3, the CPU 1 can operate in the same manner as the case where the sequencer software including the performance information arrangement program is stored in the ROM 2. This makes it easy to add sequencer software including another performance information arrangement program or to perform version up thereof. The CD-ROM drive is provided to read out the sequencer software including the performance information arrangement program and various data from a removable CD-ROM, which is a kind of the computer readable medium M. The sequencer software and various data read out can be stored onto the hard disk in the HDD. This also makes it easy to install sequencer software including a new performance information arrangement program or to perform version up thereof. The external storage device 12 may include various computer readable medium drives other than the CD-ROM drive such as the floppy disk drive, the magneto optical disk (MO) drive, the DVD (Digital Versatile Disk) drive, and so on.

Thus, the invention covers the computer readable medium M for use In the personal computer of FIG. 1 having a processor in the form of CPU 1 and a monitor in the form of the display 11. The inventive medium M contains program instructions executable by the processor for causing the computer to perform a process of arranging a target segment of music performance data by means of a template corresponding to an item of music notation to be applied to the target segment. The process is performed by the steps of displaying music performance data on the monitor for designation of a target segment contained in the displayed music performance data and for selection of a specific item of the music notation to be applied to the target segment among various items of the music notation, retrieving a template corresponding to the specific item of the music notation among a group of various templates provisionally prepared in correspondence to the various items of the music notation, customizing the retrieved template to a pitch and a length of the target segment, and rewriting the target segment of the music performance data based on the customized template to thereby arrange the target segment according to the specific item of the music notation.

The communication interface 5 is connected with the communication network 6 such as LAN (Local Area Network) or the Internet, then connected to other computer through the communication network 6. When the sequencer software including the performance information arrangement program is not stored in the ROM 2, the network is used to download the program and data from the other computer. In this case, a client of the hardware configuration according to the invention sends a server of the other computer a command for requesting download of the program or data through the communication interface 5 and the communication network 6. Upon receipt of the command, the other computer distributes the requested program and data to the hardware configuration shown in FIG. 1 through the communication network 6. The hardware configuration then receives the program and data through the communication interface 5 and stores the same into the hard disk drive. Thus, the program and data can be downloaded.

As described above, according to the invention thus configured, a plurality of score symbol names and/or score symbols are displayed so that the user can select a desired score symbol name or score symbol out of the plurality of score symbol names or score symbols displayed, thereby selecting a performance information editing template corresponding to the score symbol. It is therefore possible for the user to easily create performance information corresponding to the score symbol written on a score regardless of whether the meanings of score symbols written on the score are known or unknown. This easily allows even beginners to create performance information according to the score symbols written on the score. Further, since various values of pitch variation parameters in a template selected out of the performance information templates prepared can be modified to desired values, any user can easily create diverse performance information with user's modifications.

What is claimed is:

1. A method of arranging a target segment of music performance data by means of a template corresponding to an item of music notation to be applied to the target segment, the method comprising the steps of:

displaying music performance data on a monitor for designation of a target segment contained in the displayed music performance data and for selection of a specific item of the music notation to be applied to the target segment among various items of the music notation;

retrieving a template corresponding to the specific item of the music notation among a group of various templates provisionally prepared in correspondence to the various items of the music notation;

customizing the retrieved template to a pitch and a length of the target segment; and rewriting the target segment of the music performance data based on the customized template to thereby arrange the target segment according to the specific item of the music notation.

2. The method according to claim 1, further comprising the step of displaying the customized template on the monitor such that the customized template can be further modified on the monitor so as to impart a desired variation to the arranged target segment.

3. The method according to claim 1, further comprising the step of provisionally preparing a group of various templates in correspondence to the various items of the music notation which indicate various music renditions such that each template contains music profile data representing the music rendition of the corresponding item of the music notation, and wherein the step of rewriting rewrites the target segment of the music performance data by the music profile data of the customized template to thereby apply the music rendition to the target segment.

4. The method according to claim 1, further comprising the step of provisionally preparing a first group of templates applicable to one note and a second group of templates applicable to more than one note, such that the first group can be selected when the target segment contains only one note and the second group can be selected when the target segment contains more than one note.

5. An apparatus for arranging a target segment of music performance data by means of a template corresponding to an item of music notation to be applied to the target segment, the apparatus comprising:

a monitor device that displays music performance data;

an input device that is operated to designate a target segment contained in the displayed music performance data and to select an item of the music notation to be applied to the target segment among various items of the music notation; and a processor coupled to the monitor device and the input device, the processor being adapted to perform a process comprising the steps of retrieving a template corresponding to the selected item of the music notation among a group of various templates provisionally prepared in correspondence to the various items of the music notation, customizing the retrieved template to a pitch and a length of the target segment, and rewriting the target segment of the music performance data based on the customized template to thereby arrange the target segment according to the selected item of the music notation.

6. A computer readable medium for use in a computer having a processor and a monitor, the medium containing program instructions executable by the processor for causing the computer to perform a process of arranging a target segment of music performance data by means of a template corresponding to an item of music notation to be applied to the target segment, wherein the process comprises the steps of:

displaying music performance data on the monitor for designation of a target segment contained in the displayed music performance data and for selection of a specific item of the music notation to be applied to the target segment among various items of the music notation;

retrieving a template corresponding to the specific item of the music notation among a group of various templates provisionally prepared in correspondence to the various items of the music notation;

customizing the retrieved template to a pitch and a length of the target segment; and rewriting the target segment of the music performance data based on the customized template to thereby arrange the target segment according to the specific item of the music notation.

* * * * *